Figure 1:
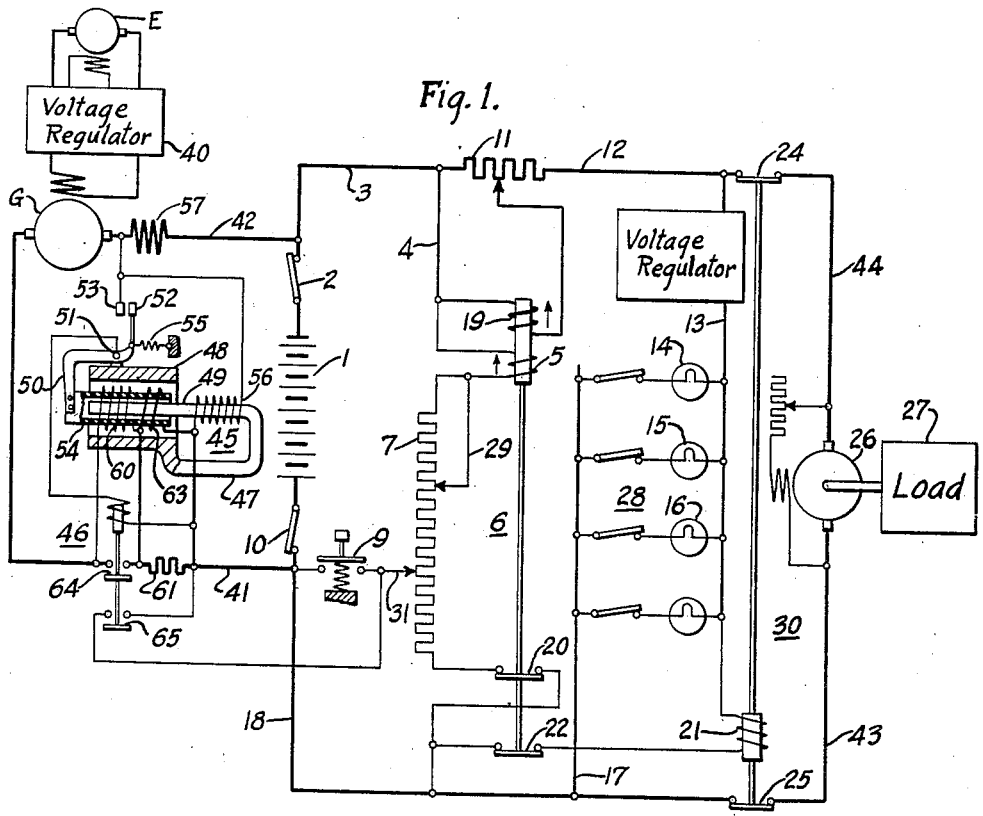

July 26, 1938.  W. M. HUTCHISON ET AL  2,125,071

BATTERY PROTECTING CONTROL SCHEME

Filed Oct. 3, 1935

WITNESSES:

INVENTORS
William M. Hutchison and
Ruel C. Jones.
BY
Paul E. Friedemann
ATTORNEY Patented July 26, 1938

2,125,071

UNITED STATES PATENT OFFICE 2,125,071

BATTERY PROTECTING CONTROL SCHEME

William M. Hutchison, Pittsburgh, and Ruel C. Jones, Wilkinsburg, Pa., assignors to Westinghouse Electric & Manufacturing Company, East Pittsburgh, Pa., a corporation of Pennsylvania Application October 3, 1935, Serial No. 43,374

6 Claims. (Cl. 171—314)

Our invention relates generally to a battery protecting control scheme, and more particularly to a relay and control system for changing the load connected to a battery in relation to the loading capacity, or condition, of the battery.

In many systems in which a storage battery supplies energy to a load, it is desirable to remove the load from the battery when the battery becomes discharged down to a predetermined limit, to prevent further depletion of the battery and/or to prevent overloading of the battery-charging equipment.

One object of our invention is to prevent depletion of a battery to a point that would result in damage to the battery or to the charging equipment.

The removal of the load from the battery may be effected to prevent damage to the battery. However, where a battery supplies a lighting load, or some other load the service of which is not to be interrupted, and also certain loads, as a motor load, the service of which may be interrupted, removal of the load for which uninterrupted service is not essential may serve the purpose of leaving a reserve capacity for the lights or the service that is not to be interrupted.

One object of our invention is to change the loading of a battery so that a reserve capacity is retained in the battery for such portion of the load on the battery for which service is not to be interrupted.

Another object of our invention is to decrease the load on a battery when the capacity of the battery has decreased to a predetermined value.

With the devices of the prior art, simple voltage relays have been used in an effort to accomplish suitable load control of a battery. A voltage relay does not give satisfactory results because it always disconnects the load when a predetermined voltage is reached during discharge, whereas the voltage of a battery is a function of the discharge current.

A voltage relay is, therefore, the wrong apparatus to use for protecting a battery. At high discharge currents, the battery voltage drops to a lower value at the end of a given ampere-hour discharge than it does when that same ampere-hour discharge is taken at lower currents. A voltage relay thus disconnects the load, or a portion of the load, as the case may be, too soon at high discharge currents and too late at low discharge currents.

In an attempt to accomplish the novel results accomplished by our invention ampere-hour meters have also been used, but such apparatus is not sufficiently rugged for most service conditions, and, further, after a number of charge and discharge cycles, gets out of step with the battery condition.

It is also an object of our invention to limit the load, that is, to prevent an overload on the charging equipment of a battery by avoiding the high charging current required by a depleted battery through a prevention of depletion of a battery below a predetermined capacity.

One object of our invention is to provide a control for a battery that is simple, reliable, inexpensive, and easily manufactured, and adjusted.

Figure 2:
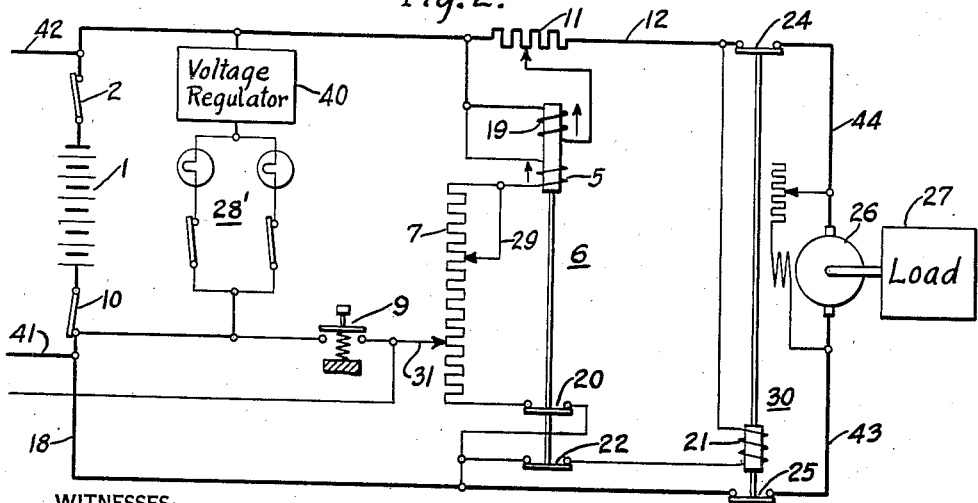

Other objects and advantages will become more apparent from a study of the following specification when considered in conjunction with the accompanying drawing, in which:

Figure 1 shows diagrammatically a system of control embodying the features of our invention; and Fig. 2 shows diagrammatically a modification of our invention.

Referring to Fig. 1, the reference character 1 designates a battery which is to be protected, and the operation of which is to be supervised by our invention. This battery is disposed to supply energy to two loads 26 and 28, load 26 representing a load for which service may be interrupted and load 28 representing a load for which service is not to be interrupted.

The air load arrangement is a typical one in equipment for air-conditioning of passenger coaches of trains. The conditioning service is obviously not nearly so necessary as the lighting service. Furthermore, the motor or motors operating the air-conditioning equipment may in fact and normally do draw the much greater portion of the current from the battery. When the battery has been depleted a certain amount, but when still of sufficient capacity to supply the lighting load for a considerable time, it may be desirable to disconnect the motor load. To accomplish such disconnection of the motor load when still a considerable amount of electrical energy is in reserve in the battery 1, a relay 6 is connected to be actuated by two coils, namely, a current coil 19 and a voltage coil 5.

The voltage coil 5 may be connected directly across the battery or may be connected to the battery as shown through a series resistor 7. A conductor 29 is connected as shown in Fig. 1 to make the effect of coil 5 adjustable. It is, of course, obvious that conductor 29 may be so positioned that all of the sections of the resistor 7 are shunted. For such an adjustment the voltage coil 5 will be connected to be responsive to the full voltage of battery 1.

The current coil 19 may be connected to carry all the current supplied to the loads by the battery or may be connected in parallel relation to a current shunt 11 to thus carry any selected proportion of the entire current supplied to the loads by the battery.

The two coils 5 and 19 are so connected and arranged with relation to the magnetic portions of the relay that their magnetic effect is additive. This additive effect is indicated by the arrows shown adjacent the coils.

During normal operation, that is, when both loads 26 and 28 are being served and while the capacity of the battery is such that both loads can be served, relay 6 will be in the energized condition, if set in operation as hereinafter explained more in detail. When in such energized condition, contact members 20 and 22 will be closed, and in consequence contactor 30 will be energized to thus keep motor 26 energized to operate load 27.

Our invention is of special utility in connection with the electrical equipment utilized on railway cars, particularly of the modern type provided with air-conditioning equipment.

In such equipment a generator G is coupled to the axle of the car, not shown, to be driven thereby. A suitable exciter E is also driven through the car axle and, through a suitable voltage regulator 40, controls the voltage of the generator so that a more or less constant voltage is supplied to the main bus bars 41 and 42 regardless of the varying speeds at which the railway car may be operated above a certain minimum speed.

The railway car, not shown, is provided with the bus bars 41 and 42 which are, through switches 2 and 10, permanently connected across the terminals of a storage battery 1. The bus bars may have a pair of feeders 43 and 44 connected thereto to supply current to a heavy duty load device 26 such as an air-conditioning plant and a pair of feeders 13 and 17 connected thereto and provided with a suitable second voltage regulator as shown for supplying a plurality of lights 14, 15, 16. This second voltage regulator for the lights only maintains the voltage of the electrical energy supplied to the lights substantially constant notwithstanding the difference between the charging voltage and the discharging voltage of the battery 1.

It is customary in car lighting systems utilizing axle driven generators and storage batteries, to provide some sort of reverse current switch mechanism 45 to assure that the axle driven generator is disconnected from the battery at all times except when the speed of the car, and hence the speed of the generator, is above a predetermined minimum value, so as to ensure that the generator G is building up sufficient voltage to charge the battery before it is connected to the battery 1. In order to lessen the duty on the contact members on the reverse current switch we prefer to use the reverse current relay 45 for actuating a heavy duty electromagnetic contactor 46 which actually performs the operation of connecting and disconnecting the axle driven generator G to the direct current bus bars 41 and 42.

The details of the reverse current relay 45 and the control associated therewith do not constitute part of our invention, but are disclosed in greater detail and claimed in the application of Donald W. Exner, filed July 7, 1932, Serial No. 621,224, entitled Reverse current switch. Disclosure of a portion of the subject matter contained in the aforementioned application is given in this application only to show just how our inventive subject matter coacts with the air conditioning equipment and reverse current relay disclosed and claimed by Exner. However, it is to be understood that our invention is not limited to the particular application herein stated.

The electromagntic reverse current relay 45 consists essentially of a field member 47 comprising a soft iron casing having a tubular portion 48 which is magnetically joined at one end to a core portion 49 which extends axially through the tubular portion 48. In addition to the frame or field member just described there is a moving element consisting of a bell crank lever 50 pivoted at 51 to a lug on the tubular portion of the frame member. One end of the bell-crank lever element carries a movable contact member 52 which cooperates with one or more stationary contact members 53, in this case, as shown, only one. The other end of the bell-crank lever carries a tube 54 of insulating material which extends through the tubular field portion and around the corresponding part of the field core 49, without touching either one. The tube 54 carries the windings of the movable element, in the form of one or more coils wound around the tube. The movable bell-crank member is normally biased toward one extreme position by means of a spring 55.

The objects of the construction just described are, first, to provide a structure in which vibration of the structure as a whole will not tend to open or close the contact members 52 and 53, and second, to provide a structure in which the electromagnetic pull between the stationary or field member and the movable member shall not be affected by the position of the movable member, thereby securing very great sensitivesness. This latter object is accomplished also by causing the field member to produce a uniform field across the air gap in which the rotor coils are disposed, somewhat similar to an electric motor, except that the rotor coils of this switch device 45 are disposed in a plane perpendicular to the axis instead of in an axial plane, as in an electric motor, with the result that a movement is produced in an axial direction instead of in a circumferential direction as in a motor.

According to the invention, a field member 47 is provided with a single exciting coil 56, the same being energized, in this case, across the terminals of the direct-current bus bars 41 and 42, or, as shown in the drawing, as a matter of convenience in making the connections, the field coil 56 may be connected between the negative bus 41 and the inner terminal of the commutating winding 57 of the axle-driven generator G, the outer terminal of this commutating winding being connected to the positive bus 42.

The distinctive feature about the invention is that two coils are utilized on the insulating tubular member 54 of the movable element. The first coil 60 is a shunt winding of many turns, which, when the axle-driven generator is disconnected from the bus, responds to the difference between the bus voltage and the generator voltage, so that a very small current is normally flowing all the time, when the generator is not working, in a reverse direction from the direct current bus bar 41 through resistor 61, the shunt coil 60 on the movable element of the reverse-current switch generator G, through the commutating field 57 and thence to the bus bar 42. This reverse current in the movable coil cooperates with the air gap field of the stationary coil 56 to produce a torque in a direction tending to assist the spring 55 in opening the contacts 52 and 53 and holding the same open. As soon as the speed of the generator increases to a point at which its voltage is higher than that of the bus bar 41, the current in the shunt coil 60 changes in direction, as the generator sends current into the bus 41, and thus a very small current-flow is produced in the shunt winding 60, which produces a torque in the opposite direction, which quickly overcomes the pull of the spring and closes the contacts 52 and 53.

The second coil 63 on the movable element now comes into play. This coil 63 is a series coil consisting of only a few turns of heavy wire, the same being connected either in series with one of the generator terminals, or connected, as shown, across a shunt consisting of a resistor element 61 of very low resistance, so as not to consume any appreciable amount of power.

As long as the only connection between the generator and the bus is through the high-resistance shunt coil 60, the current through the series coil 63 is too small to make any material difference in the operation of the device. As soon as the relay contacts 52 and 53 are closed, however, the electromagnetic contactor 46 picks up, to short-circuit the shunt coil 60 and connect the generator directly across the bus bars 41 and 42. A charging current of material amount thereupon flows from the generator to the bus, and this current, or the portion of it which passes through the series coil 63, energizes the latter in a direction necessary to maintain the electromagnetic force tending to keep the relay contacts 52 and 53 closed against the pull of the spring 55. The reverse-current relay 45 thus keeps its contacts 52 and 53 firmly closed, from the first moment of closure, and throughout the subsequent operation of the generator, until the speed of the generator drops to a value which is lower than the speed at which the contacts 52 and 53 first close. At this point, the current through the series coil 63 becomes too small to hold the switch contacts 52 and 53 closed against the pull of the spring 55 tending to open them, and the heavy-duty electromagnetic contactor 46 is thereupon opened to disconnect the generator from the bus 41 before the bus begins to send current in the reverse direction through the generator armature. The electromagnetic pull immediately set up by the shunt coil 60 is now smaller than the amount necessary to close the switch contacts 52 and 53, so that the switch contacts remain open without vibrating, until the speed of the generator again increases as first described.

Since coils 5 and 19 act additively, insufficient energization of both coils will cause the relay to drop open, that is, open contact members 20 and 22. Hence, when the discharge current is high the voltage may drop to a lower value without causing a dropping of the armature of relay 6 than will be the case for a low discharge current. In other words, a lower battery voltage is needed for a "drop-out" for relay 6 for a high discharge current than is needed for a similar "drop-out" for a lower discharge current. The adjustment of the relative effects of coils 5 and 19 is such that the "drop-out" is representative of the capacity of the battery at all times.

When the railway car is at rest, the generator is not operating and in consequence the contact members or switches 64 and 65 are open. As soon as the train starts and has attained a certain speed the voltage of generator G rises to a certain value and, as heretofore explained, electromagnetic contactor 46 operates closing switch 65. Closure of switch 65 shunts the pushbutton switch and thus brings our invention in cooperative relation with the reverse current system of control.

In the preferred arrangement shown in Fig. 1, pushbutton switch 9 is used to momentarily short-circuit a portion of the resistor 7 in series with the voltage coil 5 when it is desired to reset the relay after it has dropped out. Switch 9 is also of utility in starting the control system independent of automatically operated switch 65, as will be apparent from a presentation of a typical cycle of operation to be made presently.

If the battery is fully charged and it is desired to operate, or service, both loads 26 and 28, switches 2 and 10 are closed, whereupon a circuit is established from the negative terminal of the battery 1 through switch 2, conductor 3, resistor 11 and coil 19 in parallel, conductor 12, the voltage regulator conductor 13, any one or all of the load units 14, 15 and 16 of load 28, depending on which switches for the respective load units are closed, conductors 17 and 18, and switch 10 to the positive terminal of battery 1.

To connect the motor 26 to the battery the attendant depresses pushbutton switch 9, thereby establishing a circuit from energized conductor 3 through conductor 4, voltage coil 5 of relay 6, conductor 29, a portion of resistor 7, conductor 31, and switches 9 and 10 to the positive terminal of the battery 1.

Since the conductors 29 and 31 shunt a portion of resistor 7, coil 5 will be energized heavily with the result that relay 6 will move to the position shown in Fig. 1. Coil 19 being connected across the shunt resistor 11 will act additively with coil 5.

As soon as relay 6 operates, switch 9 may be released because the relay establishes its own holding circuit through contact members 20. Contact members 22 are also closed by the operation of relay 6 and a circuit is thus established from the energized conductor 13 through coil 21 of magnetic contactor 30 and contact members 22 to the energized conductor 18.

Operation of contactor 30 causes the closing of contact members 24 and 25 to thus connect motor 26 to the battery 1.

When the battery has been depleted a certain amount, but when still sufficient reserve capacity is left to serve load 28, relay 6 drops open. Contact members 22 are opened and in consequence contactor 30 is deenergized, with the result that load 26 is disconnected from the battery 1.

It is, of course, apparent that as long as the battery capacity is above a selected value, starting and stopping of the railway car will not cause intermittent operation of the air conditioning equipment, since the reverse curent relay 45 and the electromagnetic contactor 46 controlled thereby merely control the connection of the generator to the battery and the respective loads 26 and 28. When the car is at rest, battery 1 supplies both loads 26 and 28 if at full capacity of charge and when the car is in operation the generator assumes the loads 26 and 27 and also provides a charge current for the battery 1 dependent on the battery condition.

It is, of course, apparent that if the capacity of the battery is low, namely, if it should have been depleted to a very low value, the charging current would be of considerable value with the result that the generator might be overloaded if in addition to supplying loads 26 and 28, it were called upon to furnish a heavy charging current.

Our system of control thus protects the generator against an overload by preventing an excessive depletion of the battery through the functioning of the relay 6. When the battery has been depleted a certain amount so that a certain reserve capacity is still in the battery, the load 26 will be disconnected each time the car stops whereas when the car is in operation and the generator voltage is up to its normal value, both loads 26 and 28 will be supplied and the battery 1 will also be charged, but the instant the car stops, relay 6 will assure that the battery will only be called upon to supply the lighting load 28, unless during the preceding run the generator has been able to at least partially recharge the battery.

The modification shown in Fig. 2 is in many respects similar to the modification shown in Fig. 1 except that the reverse current control which does not constitute part of our invention has not been shown in connection with the modification shown in Fig. 2.

It will be noted that the load 28' is in the modification shown in Fig. 2 connected directly to the battery 1 so that the relay 6 will, in fact, not be affected by the load current of the load 28'. In many installations, the character of the load 28' is very much different, namely, is of a much lower value than the load 26 and in consequence the current drawn by load 28', being a small fraction of the total current drawn by both loads 26 and 28' will not materially affect the accuracy of our system of control, namely, not materially affect the sensitiveness of relay 6. For such installations where the difference between loads 26 and 28' is of considerable magnitude, the modification shown in Fig. 2 may be used and may in some instances be found preferable because of the fact that it is cheaper or simplifies the wiring.

Although we have shown and described a certain specific embodiment of our invention, we are fully aware that many modifications thereof are possible. Our invention, therefore, is not to be restricted except insofar as is necessitated by the prior art and the spirit of the appended claims.

We claim as our invention:

1. In an electrical system of control for a battery, in combination, a battery, a load, connected to the battery, means for disconnecting the load from the battery, a second load connected to the battery, and switching means connected to be responsive to the cumulative effect of the load current of the battery and the current proportional to the voltage of the battery at the load current and adapted to disconnect the second load from the battery when the combined cumulative effect of the load current and the current proportional to the battery voltage decreases to a predetermined value.

2. In an electrical system of control for a battery, in combination, a battery, a load connected to the battery, a second load connected to the battery, and switching means connected to be responsive to the cumulative effect of the load current of the battery and a current proportional to the voltage of the battery at the load current and adapted to disconnect the second load from the battery when the combined cumulative effect of load current and the current proportional to the battery voltage decreases to a predetermined value.

3. In an electrical system of control for a battery, in combination, a battery, a load therefor, means for disconnecting the load from the battery, a second load connected to the battery, and switching means connected to be responsive to the cumulative effect of the load current of the battery and a current proportional to the voltage of the battery at the load current and adapted to disconnect the second load from the battery when the combined cumulative effect of the load current and the current proportional to the battery voltage decreases to a predetermined value.

4. In an electrical system of control for a battery, in combination, a battery, a load connected to the battery, and a relay having a magnetic circuit, a current coil wound to magnetize said magnetic circuit and connected to be energized in proportion to the load current of the battery, means for adjusting such proportionality, a voltage coil wound on said magnetic circuit to act cumulatively with said current coil and connected to be energized by a current in proportion to the voltage of the battery at the load current, means for adjusting the proportionality of the energization of said voltage coil, and means adapted to counteract the action of said coils by a selected constant force selected to represent a predetermined capacity of said battery, and a contactor controlled by the relay adapted to open the circuit of a portion of the load connected to the battery.

5. In an electrical system of control for a battery, in combination, a battery, a load connected to the battery, and a relay having a current coil connected to be energized in proportion to the load current of the battery, a voltage coil acting cumulatively with said current coil connected to be energized by a current proportional to the voltage of the battery at the load current, means for adjusting the proportionality of the energization of said voltage coil, and means adapted to counteract the action of said coils by a selected constant force selected to represent a predetermined capacity of said battery, and a contactor controlled by the relay adapted to disconnect a portion of the load connected to the battery.

6. In an electrical system of control for a battery, in combination, a battery, a load for the battery, means for connecting the load to the battery, and disconnecting the load from the battery, a second load for the battery, means for connecting the second load to the battery and disconnecting the load from the battery, switching means biased to an open position by a selected constant force the biasing force being selected to be a function of a certain capacity of the battery, electromagnetic means for said switching means adapted to act in opposition to said biasing means by a force that is determined by the combined cumulative effect of a pair of electric currents proportional respectively to the load on the battery and the voltage of the battery, and means responsive to the operation of said switching adapted to disconnect a portion of the load from said battery.

WILLIAM M. HUTCHISON.
RUEL C. JONES.